(12) United States Patent
Gaffney

(10) Patent No.: US 6,213,483 B1
(45) Date of Patent: Apr. 10, 2001

(54) UTILITY CART

(75) Inventor: Thomas E. Gaffney, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 09/232,545

(22) Filed: Jan. 18, 1999

(51) Int. Cl.[7] .................................................. B62B 3/02
(52) U.S. Cl. .................. 280/47.35; 280/651; 280/79.3; 211/126
(58) Field of Search ............................ 280/47.34, 47.35, 280/639, 651, 659, 79.3, 79.11, 79.7; 211/126, 182, 189, 194; 248/165; 403/217, 218, 219, 292, 300, 327, 329

(56) References Cited

U.S. PATENT DOCUMENTS

| | | | |
|---|---|---|---|
| Re. 27,186 | 10/1971 | Ferdinand et al. | 108/144 |
| D. 149,701 | 5/1948 | Smith | D4/2 |
| D. 163,094 | 5/1951 | Connor | D14/3 |
| D. 288,331 | 2/1987 | Huldt | D34/21 |
| D. 290,177 | 6/1987 | Trubiano | D34/23 |
| D. 300,787 | 4/1989 | Carter | D6/390 |
| D. 319,716 | 9/1991 | Addison | D34/21 |
| D. 324,284 | 2/1992 | Welch | D34/21 |
| D. 362,528 | 9/1995 | Shannon et al. | D34/21 |
| D. 363,590 | 10/1995 | Kazmerchek et al. | D34/21 |
| 381,170 | 7/1997 | Dawkins | D34/23 |
| 730,322 | 6/1903 | Weston . | |
| 2,886,186 | 5/1959 | Hamilton | 211/126 |
| 2,926,022 | 2/1960 | Nau et al. | 280/79.3 |
| 3,172,376 | 3/1965 | Havlis | 108/59 |
| 3,262,714 | 7/1966 | Langone | 280/79.2 |
| 3,403,641 | 10/1968 | Baker | 108/152 |
| 3,471,112 | 10/1969 | MacDonald et al. | 248/239 |
| 3,589,746 | 6/1971 | Inglis et al. | 280/79.3 |
| 3,827,573 | 8/1974 | Guerette | 211/149 |
| 4,368,675 | 1/1983 | Propst et al. | 108/53.1 |
| 4,432,523 | 2/1984 | Follows | 248/250 |
| 4,579,358 | 4/1986 | Byfield, Jr. | 280/79.1 A |
| 4,652,003 | 3/1987 | Karashima | 280/166 |
| 4,732,358 | 3/1988 | Hughes et al. | 248/243 |
| 4,793,497 | 12/1988 | Hall et al. | 211/150 |
| 4,875,696 | 10/1989 | Welch et al. | 280/47.34 |
| 4,895,382 | 1/1990 | Andersson | 280/33.991 |
| 4,998,023 | 3/1991 | Kitts | 280/47.35 |
| 5,065,873 | 11/1991 | Tseng | 211/187 |
| 5,131,547 | 7/1992 | Goldberg | 211/149 |
| 5,174,200 | 12/1992 | Jeandel et al. | 108/111 |
| 5,280,933 | 1/1994 | Finneyfrock | 280/47.34 |
| 5,456,435 | 10/1995 | Sweeney | 248/250 |
| 5,531,464 | 7/1996 | Maurer et al. | 280/47.35 |
| 5,758,572 | 6/1998 | Hennessy et al. | 99/483 |

FOREIGN PATENT DOCUMENTS

3619262A1  10/1987  (DE) .

OTHER PUBLICATIONS

Lakeside Manufacturing, Inc., Advertisement/Brochure C. 1959.
"Double–Decker Serving Trolley", Holiday, 1991.
Lakeside Manufacturing, Inc. Catalog, Jan. 1, 1998, pp. 24, 26, 27.
The Vollrath Catalog, pp. 146–151.

*Primary Examiner*—Richard M. Camby
(74) *Attorney, Agent, or Firm*—Foley & Lardner (57) ABSTRACT

A utility cart is presented having improved assembleability, economy, rigidity and stability. In one feature, the cart includes a wheeled frame having a shelf supported by the frame. The shelf includes a movable surface and the frame includes a retention surface. The movable surface moves between a position of out of engagement with the retention surface and a position in engagement with the retention surface. This structure allows the shelf to snap into place without the need for separate mechanical fasteners. According to another feature, the cart includes a top shelf configured to deflect U-shaped leg members inward to apply a binding force upon the bottom shelf. According to a third feature, the cart includes a cross member connecting two leg members, the cross member having L-shaped slots to receive protuberances on the leg members.

43 Claims, 7 Drawing Sheets

UTILITY CART

FIELD OF THE INVENTION

The present invention relates generally to utility carts. The present invention relates more specifically to utility carts for transporting and/or bussing.

BACKGROUND OF THE INVENTION

Utility carts are used in a variety of commercial and residential applications, including commercial kitchen and food preparation applications. These utility carts typically include a top shelf, a bottom shelf, four legs, a pushing handle, and a plurality of wheels or casters attached to the bottom shelf or to a base. The shelves are typically attached to the legs by rivets, screws or welds.

These conventional utility carts have varying load capacities. One standard test for load capacity is to run the cart, fully-loaded, diagonally over a threshold. The threshold is, for example, a five-eighths inch high block of wood anchored to the floor. The cart is run back and forth over the threshold repeatedly until failure. If the cart withstands a predetermined number of runs with a given load without failing, the given load is the load capacity of the cart. While various load capacities have been used to classify "heavy duty", "medium duty", and "standard duty" carts, for purposes herein, heavy duty shall mean a capacity of approximately 650 pounds or more, medium duty shall mean a capacity of approximately 400 pounds, and standard duty shall mean a capacity of approximately 200–300 pounds.

Heavy duty carts are similar to standard duty and medium duty carts, except that design modifications provide for the increased weight capacity. One important design modification is that many of the components must be arc welded together to improve the strength and durability of the cart. For example, the shelves of heavy duty carts are arc welded to the legs.

One drawback of known heavy duty carts is that the arc welding process is a costly one, driving up the price of the cart for the consumer. Arc welding requires skilled labor and several welding steps, including polishing and refinishing.

A second drawback of known heavy duty carts is that they must be shipped in their assembled or substantially assembled state due to the components being arc welded together. To reach some markets (e.g., overseas markets), shipping costs are calculated based on the volume of the items shipped. Thus, shipping a cart in its assembled state can become costly and preclude entry in these markets. A knocked-down (i.e., shipped un assembled) cart can be shipped in approximately one-half to one-third the volume of a comparable assembled cart. Thus, a heavy duty knocked-down cart could open up significant markets where previous assembled carts were not competitively priced. However, it was previously thought impractical to design a metal cart which did not rely on arc welding for its rigidity.

Conventional knocked-down carts have drawbacks as well. These carts often have a large number of assemble able parts, e.g., screws, bolts, shelves, wheels, axles, legs, etc. Furthermore, they tend to be expensive and can lack the necessary strength required for larger loads.

Thus, it would be advantageous, though previously thought unattainable, to provide a heavy duty knocked-down cart, i.e., one that could be reduced in size for shipping, that maintains the strength and durability of a heavy duty cart and also is easy to assemble by the user. It would also be advantageous to provide a heavy duty, medium duty or standard duty cart having a simpler design to provide a more economical utility cart. More specifically, it would be advantageous to provide a heavy duty, medium duty or standard duty cart substantially free of arc welds to provide a more economical utility cart. Also, it would be advantageous to provide various design modifications to a standard utility cart to improve its strength and durability. Additionally, it would be advantageous to provide a knocked-down cart that is easily assemble able by an unskilled user.

SUMMARY OF THE INVENTION

The foregoing limitations of prior utility carts have been overcome by the present invention in its various embodiments, in which, according to one embodiment, a utility cart is provided having a frame, a plurality of wheels rotatably coupled to the frame, and a shelf supported by the frame. One of the frame and the shelf includes a retention surface and the other of the frame and the shelf includes a movable surface. The movable surface is configured to move between a first position out of engagement with the retention surface and a second position in engagement with the first retention surface to mount the first shelf to the frame. The movable surface is resiliently biased in the second position.

According to another embodiment of the present invention, a utility cart is provided having a frame with first and second spaced vertical members. The utility cart has a cross member connecting the first and second vertical members. One of the cross member and the first vertical member includes a protuberance terminating at an enlarged head, and the other of the cross member and the first vertical member includes a slot receiving the protuberance to connect the cross member to the first vertical member.

According to yet another embodiment of the present invention, a utility cart is provided having first and second substantially rigid members and a third substantially rigid member extending between and connecting the first and second rigid members. The utility cart includes a first shelf coupled between the first and second rigid members and spaced from the third rigid member by a first distance and a second shelf coupled between the first and second rigid members and spaced from the third rigid member by a second distance greater than the first distance. The second shelf is configured to deflect at least one of the first and second rigid members to apply a binding force upon the first shelf.

According to still another embodiment of the present invention, a utility cart is provided having first and second substantially rigid members and a third substantially rigid member extending between and connecting the first and second rigid members. The utility cart includes a first shelf coupled between the first and second rigid members. The first shelf and the first rigid member are coupled together to define a distance between the first and second rigid members at a location at which the second shelf is to be attached. The length of the second shelf at the location of attachment is different than the distance.

According to one aspect of this embodiment, the rigid members comprise a substantially U-shaped leg member.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED EMBODIMENTS

Figure 1:
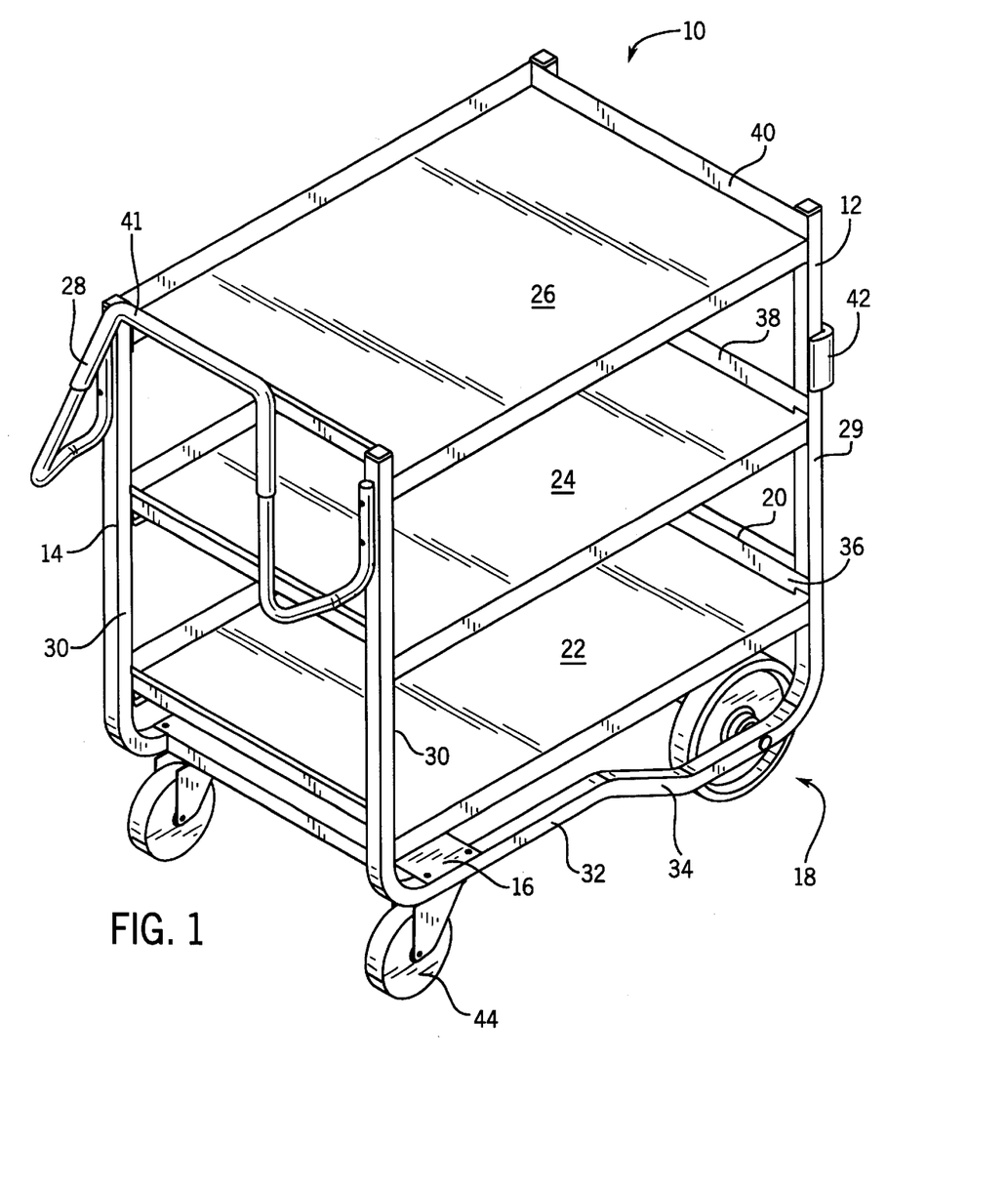
FIG. 1 is a perspective view of a utility cart according to one embodiment of the present invention.

Referring first to FIG. 1, a heavy duty utility cart 10 is shown according to one embodiment of the present invention. Alternatively, utility cart 10 may also be medium duty, standard duty, or having another capacity. Cart 10 is shown in its assembled state but is capable of being shipped substantially un assembled, or "knocked-down." The component elements of cart 10 are made substantially of stainless steel or other suitable rigid material such as other metals, polymers, plastics and wood. Several features of utility cart 10 contribute to the assemble ability, economy, rigidity and stability of the cart.

In this embodiment, cart 10 includes a first frame member 12, a second frame member 14, a rear wheel base 16, an axle 18, a cross member 20, a plurality of shelves 22, 24, 26 and a push handle 28. Frame members 12, 14 are similar in structure, preferably being substantially U-shaped. Alternatively, frame members 12, 14 may be O-shaped, V-shaped or otherwise shaped. Because frame members 12, 14 are U-shaped, frame members 12, 14 provide a reduction in the number of components and assembly time (e.g., by reducing four legs, a base and associated mechanical fasteners to two frame members) and add strength to the cart (e.g., by eliminating numerous assembled components and replacing them with two integrally molded or formed components). Each frame member 12, 14 includes a first substantially rigid, vertical member 29, a second substantially rigid, vertical member 30 and a third substantially rigid, horizontal member 32 extending between and connecting rigid members 29, 30. Rigid members 29, 30, 32 are integrally formed with one another in one-piece construction, but may also be welded, screwed, or otherwise coupled to one another to form frame member 12. Frame members 12, 14 are made from square tubing in this embodiment, but may also be made from, e.g., circular tubing, rectangular tubing, an L-shaped cross sectional member or solid rod. Frame members 12, 14 further include an ornamental bent portion 34. Frame members 12, 14 individually and collectively provide structural integrity to cart 10.

A second feature of cart 10 is cross member 20. Cross member 20 extends between and connects first and second frame members to provide additional structural integrity to cart 10. The novel coupling arrangement of cross member 20 to cart 10 will be described hereinafter with reference to FIGS. 2 and 3A–3D.

Yet another feature of cart 10 resides in the structures by which some or all of bottom shelf 22, middle shelf 24 and top shelf 26 couple to frame members 12, 14. These structures, which will be described hereinafter with reference to FIGS. 2 and 4A–4J, allow some or all of shelves 22, 24 and 26 to be shipped in an un assembled state and later easily assembled without the need for mechanical fasteners or welds by essentially snapping into place on frame members 12, 14. Alternatively, one or more of shelves 22, 24, 26 may be welded, screwed, bolted, or hinged attached to frame members 12, 14 as will be described hereinafter while still realizing some of the advantages of the present invention. Shelves 22, 24, 26 are made of a rigid material, such as, sheet metal with a thickness of 0.060 inches, and preferably contain walls 36, 38, 40, respectively, extending around a substantial, but not complete, portion of the perimeters of shelves 22, 24, 26. Walls 36, 38, 40 serve as a rim to keep items stored on shelves 22, 24, 26 from sliding off, while the unwalled portions of the perimeters of shelves 22, 24, 26 facilitate easy removal of these items. Walls 36, 38, 40 further add structural integrity to shelves 22, 24, 26.

Still another feature of cart 10 is that coupling top shelf 26 to at least one of frame members 12, 14 will create a binding force on bottom shelf 22, middle shelf 24, and ultimately on all of cart 10, thereby providing additional structural integrity to cart 10. The various embodiments in which this binding force may be created will be described hereinafter with reference to FIGS. 2 and 5A–5B, Additional features of cart 10 include push handle 28 which may be of any shape suitable for receiving a force from a user and transferring the force to the frame of cart 10. In this preferred embodiment, push handle 28 is as shown and described in U.S. Design Pat. No. 396,925, incorporated herein by reference. Push handle 28 also preferably acts as a rigid cross member between frame members 12, 14, providing additional structural integrity to cart 10. Push handle 28 may also include a gripping portion 41 characterized by a surface having an increased friction to prevent slippage of a user's hands from handle 28. Cart 10 may also include a bumper 42 coupled to each first rigid member at a predetermined height from the ground. Cart 10 is additionally provided with a plurality of wheels 44 rotatably coupled to the frame of cart 10, some of which may be casters, constructed of suitable heavy duty, medium duty or standard duty components.

Figure 2:
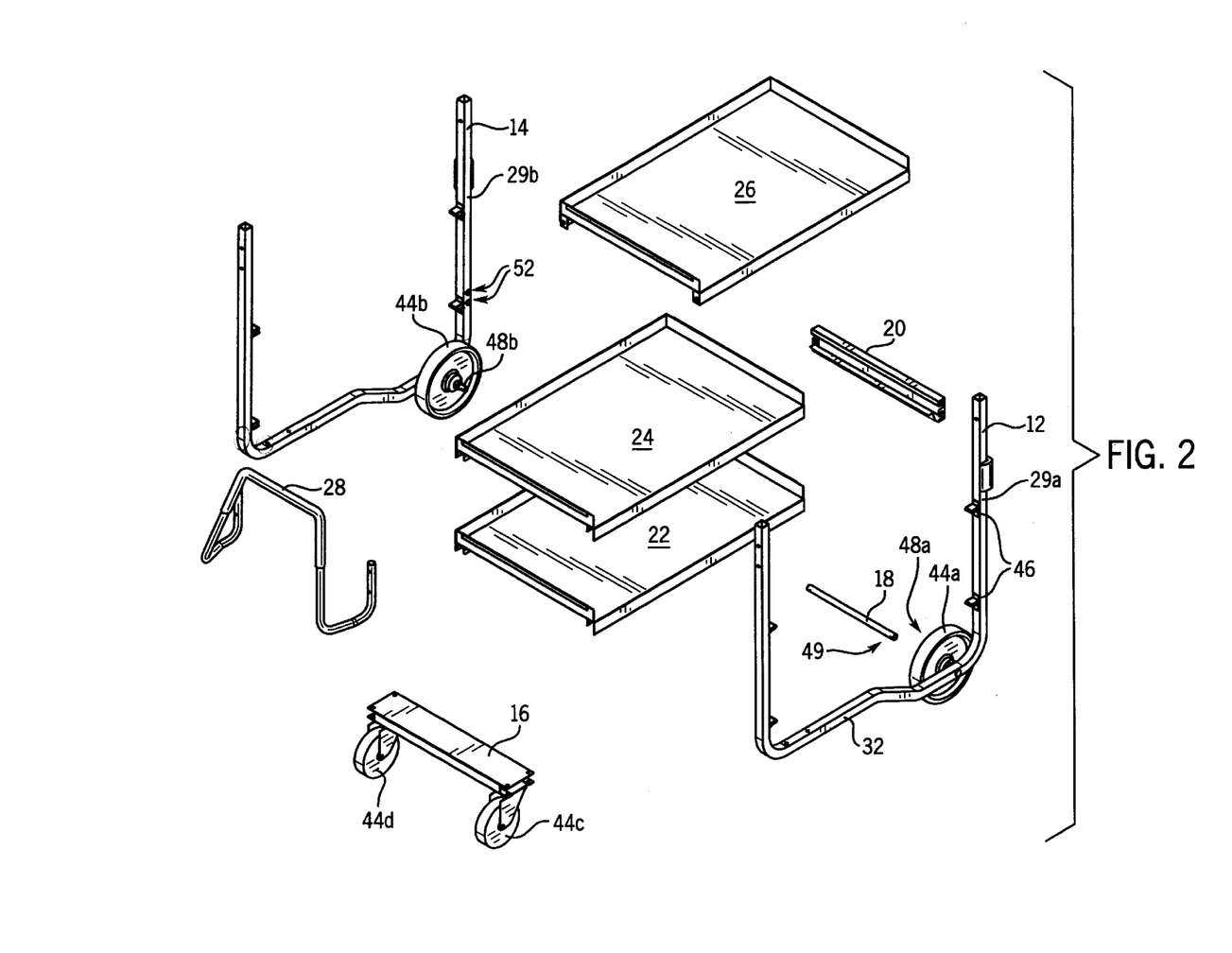
FIG. 2 is an exploded view of the utility cart of FIG. 1 in its un assembled or knocked-down state.

With reference now to FIG. 2, an exploded view of cart 10 is shown in its un assembled state. One method of assembling cart 10 will now be provided, though many methods of assembling cart 10 in this embodiment are suitable. Furthermore, with the various additional embodiments of cart 10 not specifically disclosed but contemplated herein, other methods may be preferable to assemble cart 10. A user begins with frame member 12 which now shows additional features not readily view able in FIG. 1, such as, brackets 46. Frame member 12 includes a wheel 44a rotatably coupled thereto. Coupling wheels 44 to their respective frame components (e.g., rear wheel base 16, frame members 12, 14) before shipment provides additional ease of assembly for the user, though wheels 44 could alternatively be coupled by the user to their respective frame components. The user inserts axle 18 into a mating protrusion 48a (see 48b as an example). Axle 18 is made from steel or other rigid material and is preferably a hollow tube, thereby providing greater stability than a comparably sized solid rod. Axle 18 may alternatively be a solid rod, square rod, etc. Axle 18 also is a seam less tube for added strength, though a steamed tube could be used in the alternative. Axle 18 includes an aperture 49 defined by axle 18 for mating alignment with protrusion 48a, through which the user may insert a cotter pin, screw, or other rigid member to couple axle 18 to wheel 44a.

Next, the user couples rear wheel base 16 to frame member 12, preferably by screws or bolts, or alternatively by welding or other coupling structures. Base 16 may also be coupled by a snap-tight mechanism such as that described hereinbelow with reference to FIGS. 2 and 4A–4J or other coupling structures such as a Clovis pin. Base 16, like frame member 12, is shipped with wheels 44c, 44d coupled thereto, though these wheels may alternatively be coupled to base 16 by the user via screws, bolts or welds. Wheels 44c, 44d are casters to provide steering for cart 10. The user may now couple frame member 14 to base 16 and axle 18 in a similar manner as frame member 12.

Next, the user couples cross member 20 to the assembly. At this point in the assembly, the assembly has a good deal of stability due to the rigidity of frame members 12, 14, base 16 and axle 18. Thus, it is difficult to bend rigid members 29a, 29b apart to insert an additional cross member. The novel structure of cross member 20 addresses this problem with an easily assemble able structure.

Figures 3A, 3B, 3C:
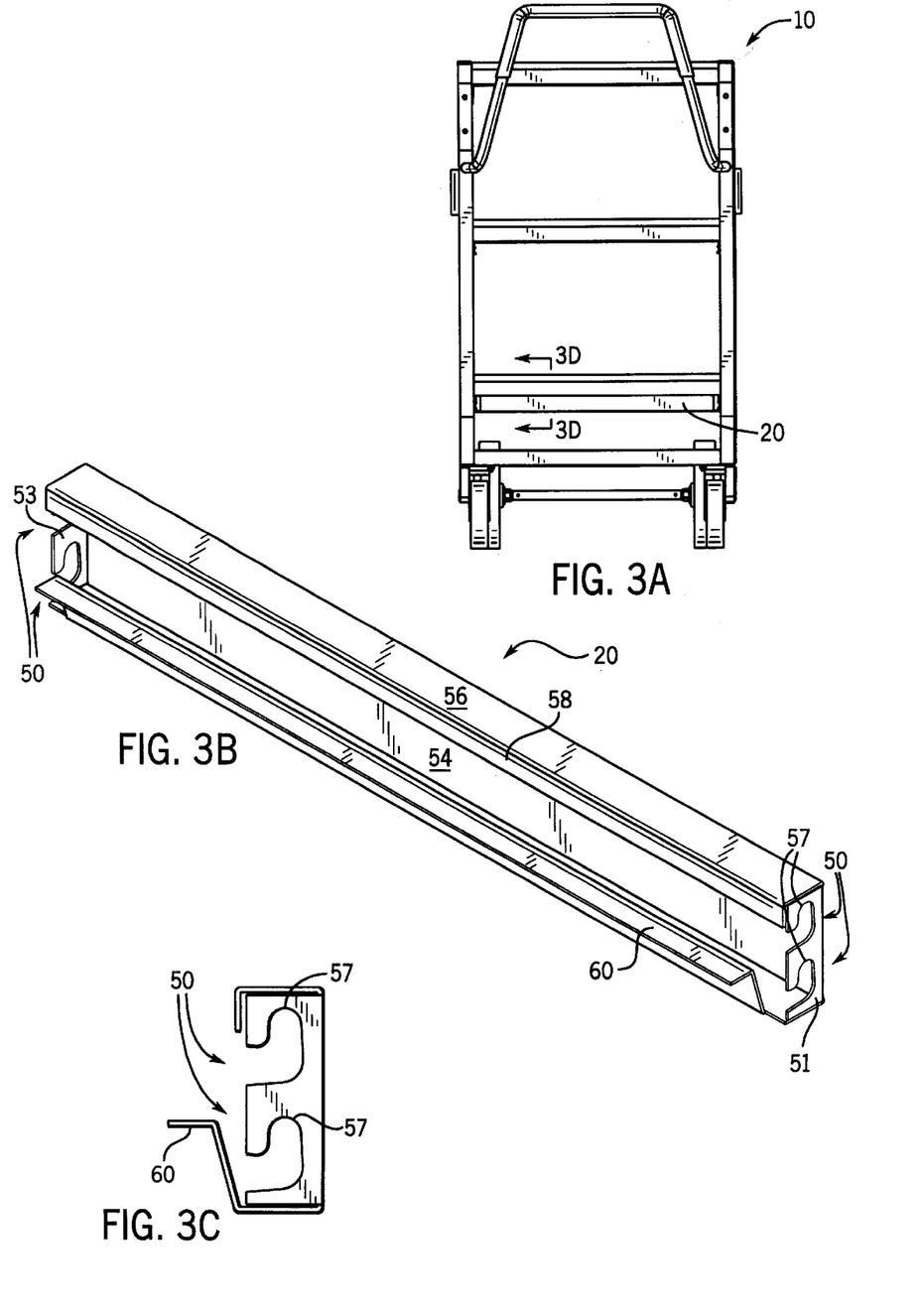
FIG. 3A is a rear view of the utility cart of FIG. 1.
FIG. 3B is a perspective view of a cross member of the utility cart shown in FIG. 2.
FIG. 3C is a right side view of the cross member of FIG. 3B.

Referring first to FIG. 3A, a rear view of cart 10 is showing a portion of cross member 20 extending below bottom shelf 22. With reference now to FIG. 3B, a perspective view of cross member 20 is shown. Cross member 20 is made of one-piece construction, but may alternatively be constructed by welding various components together. Cross member 20 includes a plurality of enforcing members (e.g., members 54, 56, 58) to provide stability to cart 10 when inserted between frame members 12, 14. A novel coupling arrangement includes cross member 20 defining a plurality of slots 50 on each end 51, 53 adapted to receive protuberances 52 (see FIG. 2) extending inwardly from frame members 12, 14. Protuberances 52 are passed between a flange 60 and member 58, and into slots 50. Then, cross member 20 is moved downward, forcing protuberances 52 into an upper portion 57 of slots 50, and rigidly coupling frame members 12 and 14 together. Slots 50 are L-shaped, but may alternatively be tear-drop shaped, or otherwise shaped to receive protuberances 52. Protuberances 52 may be pins or other extensions including an axial stop surface, such as an enlarged head portion. Alternatively, protuberances 52 could extend from cross member 20 and slots 50 could be defined by frame members 12, 14. More or fewer protuberance/slot pairs could be provided on either or both of ends 51, 53, or one of ends 51, 53 could be hinged coupled to one of frame members 12, 14. Also, protuberances 52 could be outwardly extending from frame members 12, 14, in which case cross member would engage protuberances 52 on the front or outsides of cart 10.

Figure 3D:
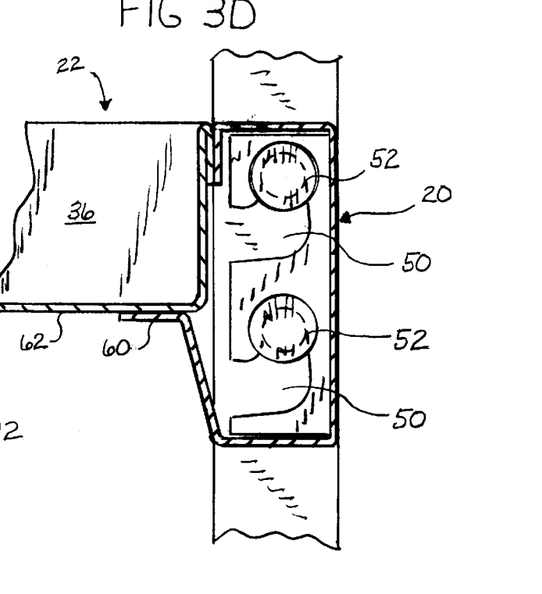
FIG. 3D is a cross-sectional view of the cross member of FIG. 3A taken along line 3D—3D in FIG. 3A.

Reference is made to FIG. 3D in which a cross-sectional view of slots 50 and protuberances 52 is shown in an assembled position. Also shown is bottom shelf 22 including wall 36 in its snap-tight assembled position (as will be discussed hereinbelow in greater detail). Shelf 22 may alternatively be coupled to frame members 12, 14 by screws, bolts, welds, or hinged structures. Shelf 22 and cross member 20 are in a cooperative relationship in their assembled position, the rigid presence of shelf 22 preventing cross member 20 from moving upward into a disassembled state via flange 60, and, in one embodiment, flange 60 exerting a resilient force upon an underside 62 of shelf 22 to provide additional rigidity and support to shelf 22. The resilient force is exerted upon shelf 22 because rigid flange 60 (e.g., stainless steel) is bendable relative to cross member 22 but resiliently biased in the first position as shown in FIG. 3C. When the position of shelf 22 is such that rigid flange 60 is bent away from shelf 22, flange 60 exerts the resilient force upon the underside 62 of shelf 22.

Thus, cross member 62, in its assembled state, provides all the necessary rigidity of a conventional cross member without the need for any mechanical fasteners.

Referring again to FIG. 2, the next step in assembling cart 10 may be either attaching bottom shelf 22 followed by top shelf 26 or vice-versa. FIG. 2 shows a plurality of brackets 46 adapted for engagement with bottom shelf 22 and middle shelf 24. While cart 10 has three shelves 22, 24, 26, cart 10 may alternatively have only bottom shelf 22 and top shelf 26, or cart 10 may have only top shelf 26. Also, the snap-tight assembly of shelves 22 and 24 may also apply to top shelf 26, though in this embodiment, top shelf 26 is screwed in place.

Figure 4A:
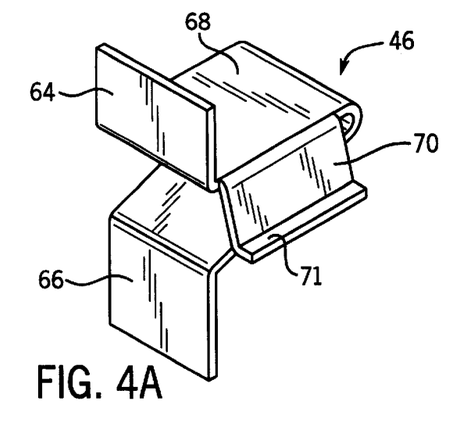
FIG. 4A is a perspective view of a bracket of the utility cart shown in FIG. 2.
Figure 4B:
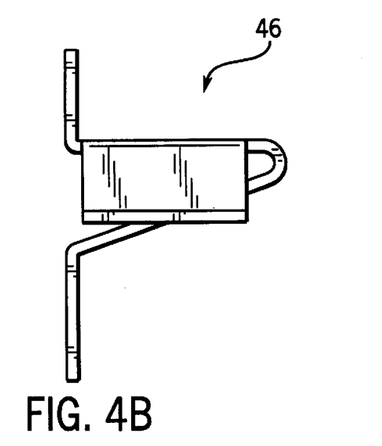
FIG. 4B is a right side view of the bracket of FIG. 4A.

Referring now to FIG. 4A, a perspective view of a bracket 46 is shown. Each bracket 46 is spot-welded during manufacturing to frame members 12, 14 at first and second mounting surfaces 64, 66 (see FIG. 4G). Each bracket 46 includes a support surface 68 adapted to receive the underside of a shelf in a substantially flat engagement. Extending from support surface 68 is a retention portion 70 including one or more retention surfaces and a lip 71, retention portion 70 being resiliently biased in a first position. Bracket 46 is made of one-piece construction from a rigid material (e.g., stainless steel) having a uniform thickness, as shown in the right side view of FIG. 4B, but may alternatively be a composite of welded components. Also, while one configuration of bracket 46 is shown, various alternative configurations having a support surface and a retention portion are contemplated by the present invention.

Figure 4C:
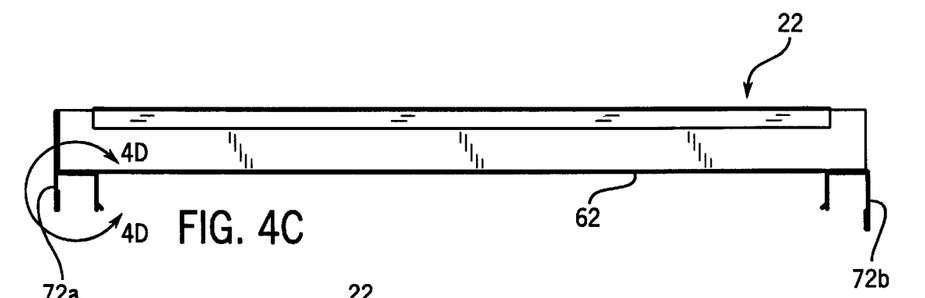
FIG. 4C is a rear view of a bottom shelf of the utility cart shown in FIG. 2.
Figure 4D:
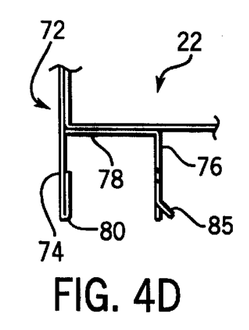
FIG. 4D is a cross-sectional view of the bottom shelf of FIG. 4C taken along line 4D.
Figure 4E:
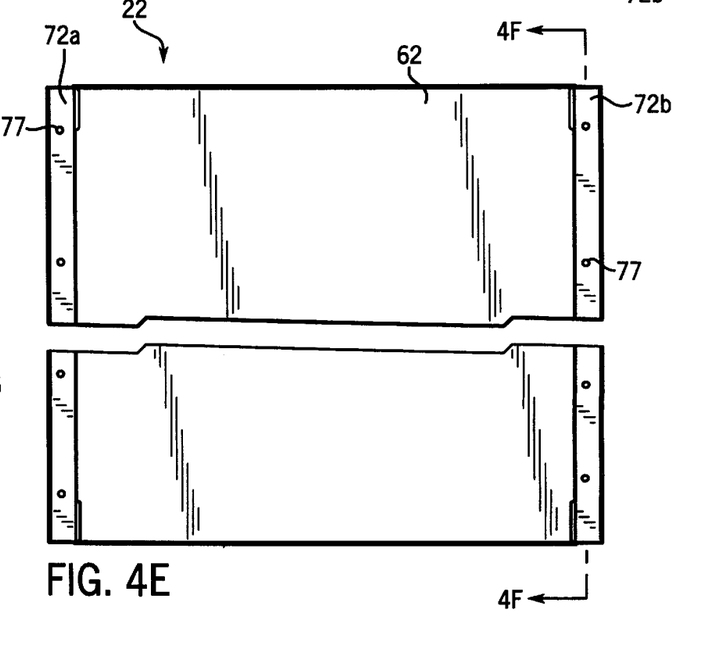
FIG. 4E is a broken bottom view of a bottom shelf of the utility cart shown in FIG. 2.

Referring now to FIG. 4C, a rear view of bottom shelf 22 is shown. In this embodiment, bottom shelf 22 and middle shelf 24 are of identical construction, simplifying manufacturing and contributing to the economy of the cart 10. A channel or gutter 72a, 72b is coupled to the underside 62 of shelf 22 extending substantially the entire length of shelf 22. While in alternative embodiments, channels 72a, 72b need not extend the full length of shelf 22, (i.e., each channel 72a, 72b could, for example, include two channels, one on each end of the full length of shelf 22), the greater the length extended by channels 72a, 72b, the greater the stiffening effect channels 72a, 72b will add to shelf 22 to improve the structural stability of cart 10. With reference to FIG. 4E, a bottom view of shelf 22, channels 72a, 72b can be seen spot welded or otherwise coupled to underside 62 of shelf 22. As shown in greater detail with reference to FIG. 4D, a cross-sectional view taken along line 4D in FIG. 4C, channels 72a, 72b each include a first side 74, a second side 76 and a third side 78 extending between and coupling first and second sides 74, 76. One or more of sides 74, 76, 78 may be integrally formed with shelf 22 while the others are coupled thereto. In this embodiment, first wall 74 is an extended portion of shelf 22 while second and third walls 76, 78 are constructed from a second piece and coupled to underside 62 of shelf 22 by spot welds 77. First wall 74 further includes a hem 80 to round the bottom edge of first wall 74.

Figure 4F:
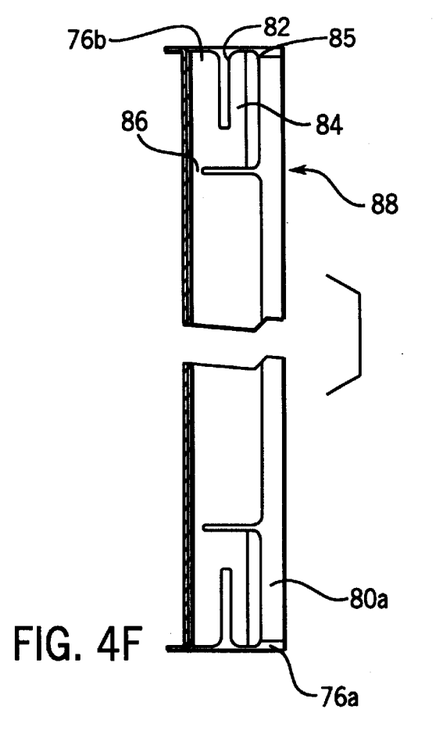
FIG. 4F is a broken cross-sectional view of the bottom shelf of FIG. 4E taken along line 4F—4F.

With reference to FIG. 4F, a cross-sectional view of FIG. 4E taken along lines 4F—4F, the terminal ends of second wall 76b of channel 72b are shown in greater detail. FIG. 4F also depicts second wall 76a having hem 80a. Each end of wall 76b defines a slot 82, a movable portion 84 including one or more movable surfaces and a lip 85, and a narrowed portion 86. Movable portion 84 is resiliently biased in a second position (see FIG. 4D, FIG. 4G), but is extendible to a first position (see FIG. 4H), as will be described with greater detail in FIGS. 4G–4J. Narrowed portion 86 and associated slot 88 facilitate movement of movable portion 84 between the first and second positions. Slot 88 may be defined at a range of distances relative to slot 82 along wall 76b. The closer slot 88 is to slot 82, the more flexibility movable portion 84 will have between the first and second positions. However, movable portion 84 will provide less retention force when coupled to retention portion 70 (as shown below) as slot 88 is moved closer to slot 82, thereby decreasing the overall torsional rigidity of cart 10. In this embodiment, the distance between slots 82 and 88 is approximately one half inch, offering a suitable trade-off between flexibility and retention force, while an optimal trade-off can be calculated using known methods. As a further note, one further feature of the present invention is that slots 50, 82 and 88 are hidden from view in the assembled state to prevent food from entering the slots and causing an unsanitary condition.

Figure 4G:
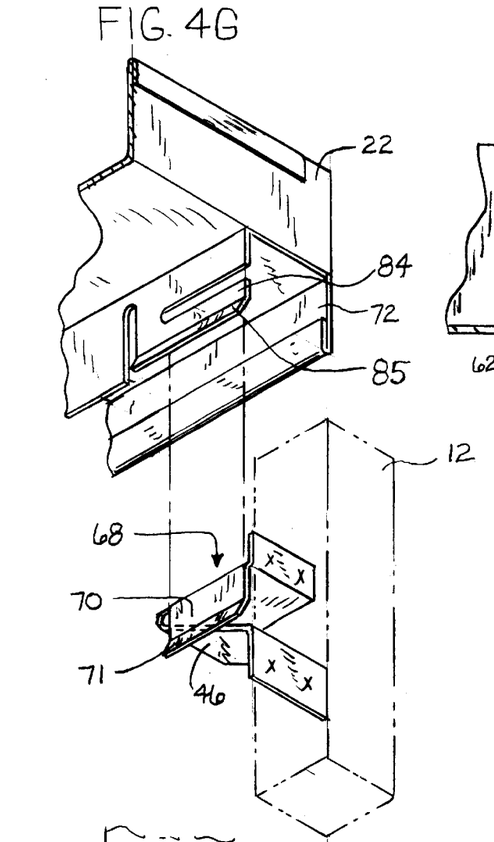
FIGS. 4G–4I are perspective views illustrating a movable surface of the shelf of FIG. 4C–4F moving into engagement with a retention surface of the bracket of FIGS. 4A and 4B.

Referring now to FIGS. 4G–4J, two perspective views and two cross sectional views serve to illustrate the coupling arrangement of a shelf to the frame of cart 10 and, more specifically, the coupling arrangement of shelf 22 to one of four brackets 46 coupled to frame member 12. In FIG. 4G, the user positions one corner of shelf 22 over bracket 46 and, more specifically, positions an end of channel 72 over bracket 46, aligning movable portion 84 with retention portion 70. Note that the width of support surface 68 of bracket 46 is substantially the same width of the inside of channel 72 to ensure a snug fit of channel 72 over bracket 46. The user then begins lowering shelf 22 over bracket 46, causing movable portion 84 to contact retention portion 70 and, in particular, causing lip 85 to contact lip 71. This contact along with additional downward force on shelf 22 causes movable portion 84 to move outward relative to the inside of channel 72, movable portion 84 being forced outward by retention portion 70. This outward movement of movable portion 84 is facilitated by lip 85 sharing a similar angle of extension relative to movable portion 84 as lip 71 has relative to retention portion 70.

Figures 4H, 5B:
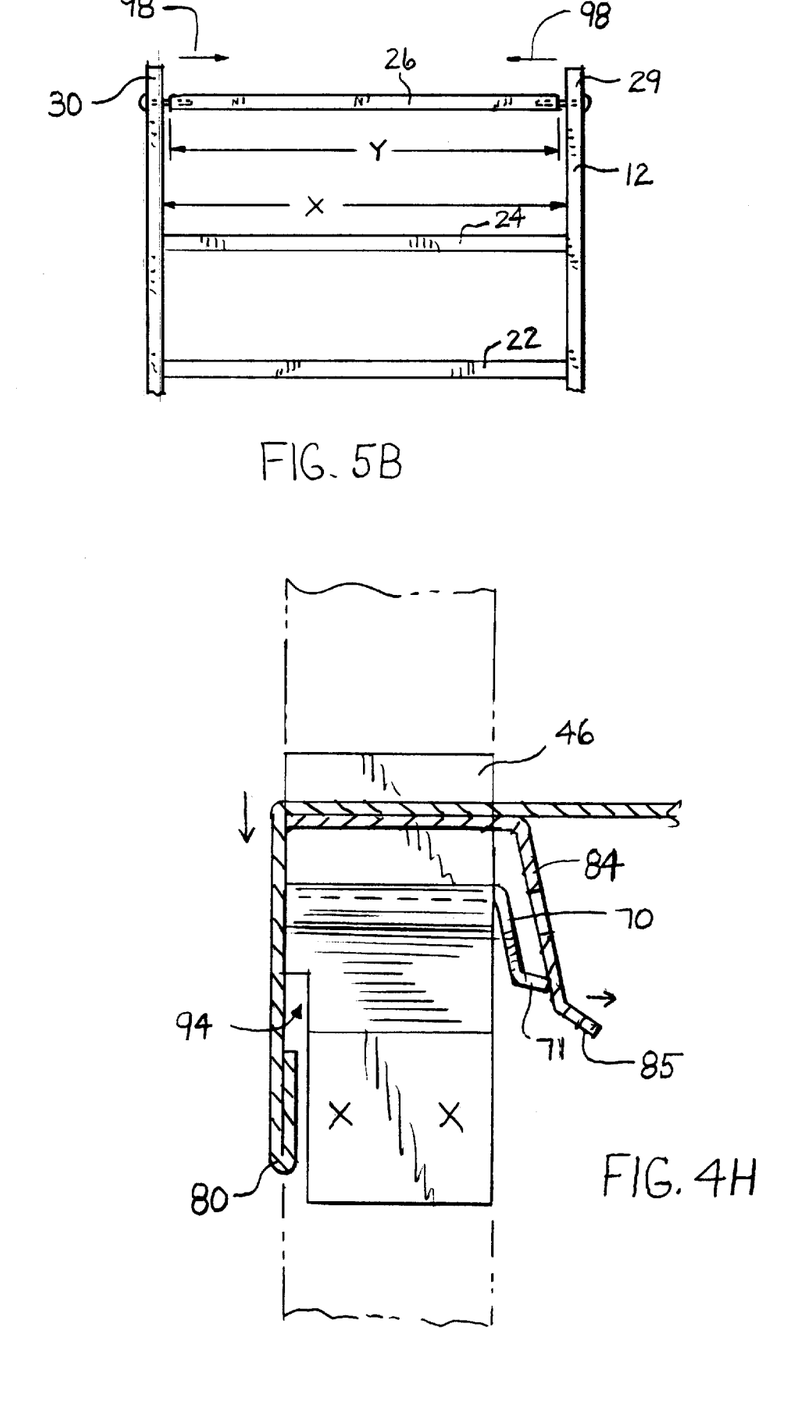
FIG. 5B is a fragmentary right side view of the utility cart of FIG. 1 showing compression of the bottom and middle shelves between first and second rigid members.

Referring now to FIG. 4H, movable portion 84 is shown in its first position. In this position, movable portion 84 is forced outward. However, retention portion 70 is also forced somewhat inward due to the equal and opposite force being exerted by movable portion 84 on retention portion 70. The extent to which retention portion 70 moves and movable portion 84 moves depends upon the resilient force biasing each portion 70, 84 in its resiliently biased position. Accordingly, it is not limiting in the present invention whether retention portion 70 moves completely, movable portion 84 moves completely, or both portions 70, 84 move partially to accommodate one another. As such, portion 84 could be the retention portion and portion 70 could be the movable portion. In this embodiment, the addition of slot 88 ensures movable portion 84 will do a substantial amount of the movement.

Figure 4I:
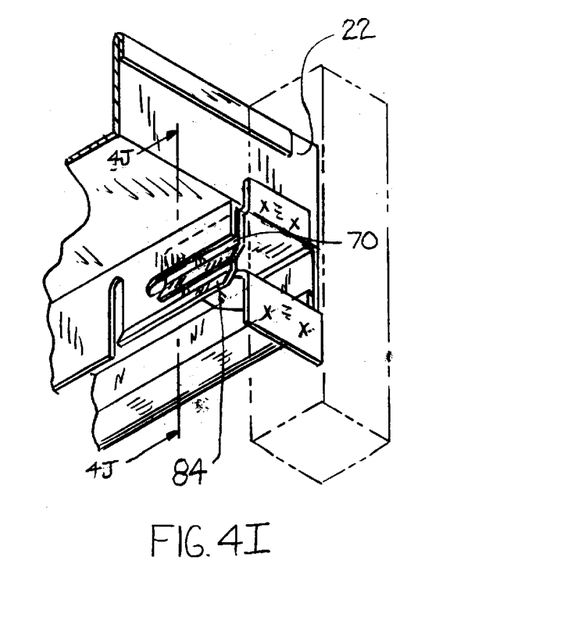

Referring now to FIG. 4I, the user now applies a force to shelf 22 to overcome the resilient force between movable portion 84 and retention portion 70 and to move shelf 22 downward until retention portion 84, and specifically lip 71, extends into slot 82, causing movable portion 84 to move to its second position. In this second position of movable portion 84, a retention surface 90 of retention portion 70 (FIG. 4J) is in engagement with a movable surface 92 of movable portion 84. Retention surface 90 prevents upward movement of shelf 22. Retention portion 70 may also include other retention surfaces to engage other movable surfaces on movable portion 84 to prevent movement of shelf 22 in other directions, including movement in one or more of all three directions of the Cartesian coordinate system. Of course, the size and orientation of slot 82, and specifically the orientation of movable surfaces on slot 82, will cooperate with these other retention surfaces to prevent movement in the various directions.

The feature of the present invention shown in FIGS. 4A–4J is not limited to the specific structure disclosed herein. For example, shelf 22 could include a spring-biased bolt in place of movable portion 84, the bolt including one or more movable surfaces for engagement with a suitably adapted retention surface on bracket 46 (e.g., an aperture sized to receive the spring-biased bolt). Alternatively, bracket 46 could include the spring-biased bolt in place of retention portion 70 and shelf 22 could include the suitably adapted retention surface. Other alternative embodiments are contemplated.

Figure 4J:
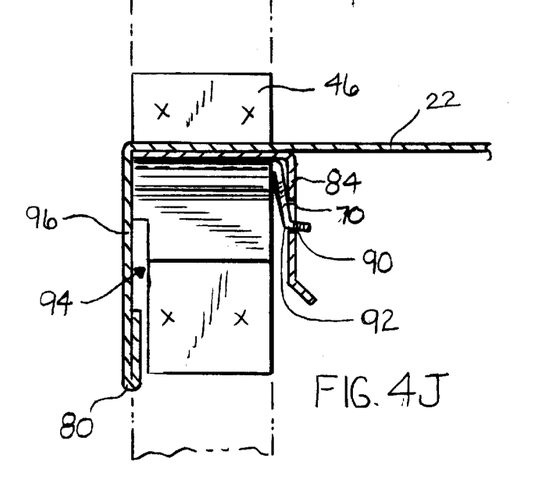
FIG. 4J is a cross-sectional view of the engaged shelf and bracket of FIG. 4I taken along line 4J—4J.

FIGS. 4H and 4J further show a notch 94 in bracket 46 adapted to receive hem 80. Notch 94 provides a recess for hem 80 to prevent bracket 46 from forcing wall 96 of shelf 22 outward.

Referring again to FIG. 2, the user snaps each of the four corners of shelf 22 into coupling engagement with brackets 46 to secure shelf 22 to the assembly. Alternatively, shelf 22 could be hinged attached to one of frame members 12, 14 during manufacturing, allowing shelf 22 to be shipped in a partially knocked-down state, in which case fewer than four of brackets 46 would be needed to assemble shelf 22 to frame members 12, 14. Bottom shelf 22 is distanced from third rigid member 32 by a first distance. Middle shelf 24 is assembled in a similar manner as bottom shelf 22 and is distanced from third rigid member 32 by a second distance greater than the first distance. As mentioned hereinbefore, cart 10 may be assembled as a two-shelf unit by eliminating middle shelf 24, or may even be assembled as a one-shelf unit by eliminating middle shelf 24 and one of bottom shelf 22 and top shelf 26.

As a final step in assembling this embodiment, top shelf 26 and frame member 28 are coupled to the assembly. Top shelf 26 and frame member 28 are coupled to frame members 12, 14 with screws, bolts, threaded inserts (i.e., "trick nuts") or other fasteners as is known. Top shelf 26 is distanced from third rigid member 32 by a third distance greater than the second distance. Top shelf 26 may also be hinged attached to one of frame members 12, 14 during manufacturing, allowing shelf 26 to be shipped in a partially knocked-down state.

Figure 5A:
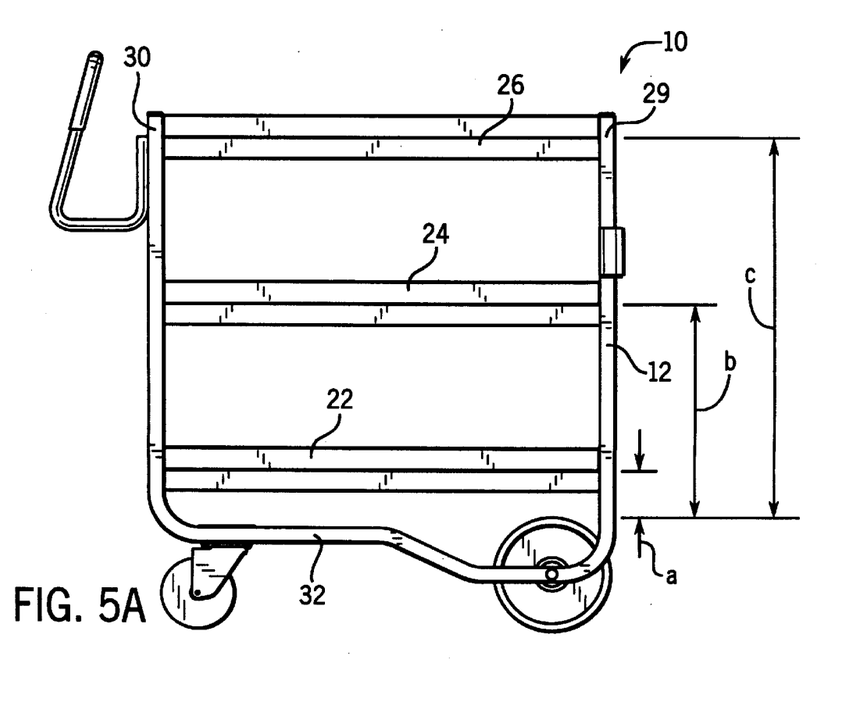
FIG. 5A is a right side view of the utility cart of FIG. 1.

With reference now to FIG. 5A, a right side view of cart 10 is shown in its assembled state. Assembled cart 10 may stand approximately thirty-four inches in height, or it may be any standard, regulated or other height. As can be seen, shelf 22 is distanced from member 32 by a first distance a, shelf 24 is distanced from member 32 by a second distance b greater than first distance a, and shelf 26 is distanced from member 32 by a third distance c greater than second distance b.

FIG. 5B, a partial view of FIG. 5A, shows yet another feature of the present invention not illustrated in FIG. 5A which contributes to the structural rigidity of cart 10. Shelf 26 has a first length Y. Shelves 22 and 24 have a second length greater than first length Y. Thus, shelf 22 is coupled to first and second rigid members 29, 30 to define a distance X between rigid members 29, 30 at a location at which shelf 26 is to be attached. The length Y of shelf 26 is greater or less than distance X. In this way, when shelf 26 is coupled to rigid members 29 and 30, shelf 26 is configured to deflect at least one of first and second rigid members 29, 30 inward relative to cart 10 as indicated by arrows 98, thereby creating a binding effect (due to the rigid nature of members 29, 30) on shelves 22 and 24, and ultimately on cart 10 to improve the overall stability. This feature also provides stability to overcome slight manufacturing tolerances that could otherwise result in loose fittings, e.g., of shelves 22, 24 to frame members 12, 14.

The feature disclosed with reference to FIG. 5B need not be limited to the structural embodiment wherein shelf 22 is shorter in a length extending between first and second rigid members 29, 30 than is shelf 26. In an alternate embodiment, shelves 22, 24 and 26 can be of the same length with a small spacer member (e.g., a portion of brackets 46) inserted between the ends 100, 102 of shelf 22 and/or analogous ends of shelf 24 and rigid members 29, 30. In this embodiment, distance X will be greater than distance Y, and shelf 26 will still be configured to deflect at least one of first and second rigid members 29, 30 inward relative to cart 10, thereby creating the desired binding effect. Thus, it can be seen that the lengths of shelves 22, 24, 26, and of third rigid member 32 may all be equal, some greater than others, or all different. The present feature also need not be limited to the embodiment above wherein first and second rigid members 29, 30 are substantially straight. In other alternate embodiments, rigid members 29, 30 may be curved inward (i.e., concave relative to cart 10), curved outward (i.e., convex relative to cart 10), crooked, or otherwise shaped.

FIG. 5B further discloses a first portion 104 of first rigid member 29 extending between shelf 22 and shelf 26 and a second portion 106 of first rigid member 29 extending between shelf 22 and third rigid member 32. Shelf 22 and first portion 104 define a first angle 108 therebetween and shelf 22 and second portion 106 define a second angle 110 therebetween. In the embodiment of FIG. 5B, at least one of angle 108 and 110 is an acute angle (i.e., less than 90 degrees), namely, first angle 108. Alternatively, other embodiments of the present feature will not include at least one of angles 108 and 110 being acute.

Having thus described one embodiment of the present invention, the numerous attendant advantages deriving from the novel aspects presented become apparent. A utility cart has been presented having considerable savings in manufacturing expense due to the elimination of costly arc welds. The present invention virtually eliminates arc welds by replacing these welds with spot welds and other structural enhancements. A further design feature is that the spot welds are generally placed in locations that are hidden from view; thus, an alternative, heavier-duty embodiment might include arc welds in place of the spot welds, the arc welds being hidden from view to reduce the amount of costly polishing and refinishing needed. The utility cart is easily assembleable, requiring very few mechanical fasteners and minimal mechanical inclination on the part of the user. Threaded inserts, cotter pins, and shelves pre-hinged to one frame member may be added to improve the ease of assembly. Furthermore, the utility cart has the ability to handle heavy duty loads while still being shipped in an un assembled state.

Many of the features of the embodiment described above are optional, e.g., while the middle shelf adds additional structural stability to the cart, the middle shelf could be removed from the assembly while still realizing many of the advantages of the present invention. Also, the shelves may be coupled to the frame members with screws or bolts instead of the snap-tight assembly described herein. In this latter embodiment, ease of assembly is compromised somewhat in favor of economy, thereby providing a cart having good structural integrity at an economical cost to the user.

While the embodiments illustrated in the Figures and described above are presently preferred, it should be understood that these embodiments are offered by way of example only. The invention is not limited to a particular embodiment, but extends to various modifications that nevertheless fall within the scope of the appended claims.

What is claimed is:

1. A utility cart, comprising:
   a frame having a support surface;
   a plurality of wheels rotatably coupled to the frame;
   a first shelf supported by the support surface of the frame, wherein one of the frame and the first shelf includes a first retention surface and the other of the frame and the first shelf includes a first movable surface, the first movable surface being configured to move between a first position out of engagement with the first retention surface and a second position in engagement with the first retention surface to mount the first shelf to the frame, and wherein the first movable surface is resiliently biased in the second position.

2. The utility cart of claim 1, wherein the first retention surface is configured to move between a first position out of engagement with the first movable surface and a second position in engagement with the first retention surface to mount the first shelf to the frame, and wherein the first retention surface is resiliently biased in the second position.

3. The utility cart of claim 1, wherein the frame includes:
   a first substantially rigid member;
   a second substantially rigid member; and
   a third substantially rigid member, wherein the first shelf is coupled to and between the first and second rigid members and spaced from the third rigid member by a first distance.

4. The utility cart of claim 3, further comprising a rigid push handle coupled to the first rigid member and the second rigid member, whereby the rigid push handle provides improved stability between the first and second rigid members.

5. The utility cart of claim 3, wherein the shelf includes a stiffening member extending a portion of a length extending from approximately the first rigid member to approximately the second rigid member, the stiffening member including a movable portion defining the first movable surface.

6. The utility cart of claim 3, wherein the first, second and third rigid members form a substantially U-shaped frame member.

7. The utility cart of claim 3, wherein one of the first substantially rigid member and the first shelf includes the first retention surface and the other of the first substantially rigid member and the first shelf includes the first movable surface, and further wherein one of the second substantially rigid member and the first shelf includes a second retention surface and the other of the second substantially rigid member and the first shelf includes a second movable surface, the second movable surface being configured to move between a first position out of engagement with the second retention surface and a second position in engagement with the second retention surface to mount the first shelf to the frame, and wherein the second movable surface is resiliently biased in the second position.

8. The utility cart of claim 1, wherein the one of the frame and the first shelf including the first movable surface includes a movable portion defining the first movable surface, the movable portion being spot welded to the one of the frame and the first shelf.

9. The utility cart of claim 1, wherein the one of the frame and the first shelf including the first movable surface includes a movable portion defining the first movable surface, the movable portion extending from the shelf at a narrowed portion, whereby the narrowed portion eases movement between the first position and the second position.

10. The utility cart of claim 1, wherein the one of the frame and the first shelf including the first movable surface includes a movable portion defining the first movable surface, the other of the frame and the first shelf including the first retention surface includes a retention portion defining the retention surface, the movable portion including a first lip and the retention portion including a second lip, the first and second lip adapted for substantial mating alignment when the first movable surface is in the first position.

11. The utility cart of claim 1, wherein the one of the frame and the first shelf including the first retention surface includes a bracket portion, the bracket portion defining the first retention surface and a support surface, the support surface engaging an underside of the first shelf.

12. The utility cart of claim 11, wherein the bracket portion is spot welded to the one of the frame and the first shelf.

13. The utility cart of claim 1, wherein the utility cart is a heavy duty cart.

14. The utility cart of claim 1, wherein the frame includes:
a first substantially rigid member;
a second substantially rigid member; and
a third substantially rigid member extending between and connecting the first and second rigid members, the first shelf coupled to and between the first and second rigid members and spaced from the third rigid member by a first distance; and further comprising:
a second shelf coupled to and between the first and second rigid members and spaced from the third rigid member by a second distance greater than the first distance, the second shelf configured to deflect at least one of the first and second rigid members to apply a binding force upon the first shelf.

15. The utility cart of claim 1, wherein the frame includes:
a first substantially rigid member;
a second substantially rigid member;
a third substantially rigid member extending between and connecting the first and second rigid members, the first shelf coupled to and between the first and second rigid members and spaced from the third rigid member by a first distance; and further comprising:
a second shelf, wherein the first shelf and the first rigid member are coupled together to define a distance between the first and second rigid members at a location at which the second shelf is to be attached, the width of the second shelf at the location of attachment being different than the distance.

16. The utility cart of claim 1, wherein the frame includes first and second spaced vertical members, and wherein the cart further includes:
a cross member connecting the first and second vertical members, wherein one of the cross member and the first vertical member includes at least one protuberance having an axial stop surface, and wherein the other of the cross member and the first vertical member includes a slot receiving the at least one protuberance to connect the cross member to the first vertical member.

17. The utility cart of claim 16, wherein the first shelf is coupled to the first and second vertical members, wherein the cross member includes a flange having a surface engaging an underside of the first shelf between the first and second vertical members, whereby the cross member is held in place by the shelf.

18. A utility cart, comprising:
a frame having at least two vertical members separated by a distance, each vertical member having an extending surface extending outward from the respective vertical member;
a plurality of wheels rotatably coupled to the frame; and
a shelf supported by the frame having first and second walls on opposing sides of the shelf for engaging the extending surfaces of the vertical members, wherein one of the shelf and a first vertical member includes a retention surface and the other of the shelf and the first vertical member includes a movable surface, the movable surface being configured to move into a position in engagement with the retention surface to mount the shelf to the frame.

19. The utility cart of claim 18, wherein the extending surfaces extend perpendicularly from the two vertical members.

20. The utility cart of claim 18, wherein the extending surfaces are support surfaces configured to engage a bottom side of the shelf when the shelf is mounted to the frame.

21. The utility cart of claim 18, wherein one of the extending surfaces and the movable surface are integrally formed on a single bracket.

22. The utility cart of claim 21, wherein the single bracket is welded to one of the vertical members.

23. The utility cart of claim 18, wherein the one of the first vertical member and the shelf including the movable surface includes a movable portion defining the movable surface, the movable portion being spot welded to the one of the first vertical member and the first shelf.

24. The utility cart of claim 18, wherein the one of the first vertical member and the shelf including the movable surface includes a movable portion defining the movable surface, the movable portion extending from the shelf at a narrowed portion, whereby the narrowed portion eases movement into the engagement position.

25. The utility cart of claim 18, wherein the one of the first vertical member and the shelf including the movable surface includes a movable portion defining the movable surface, the other of the first vertical member and the shelf including the retention surface includes a retention portion defining the retention surface, the movable portion including a first lip and the retention portion including a second lip, the first and second lip adapted for substantial mating alignment.

26. The utility cart of claim 18, wherein the utility cart is a heavy duty cart.

27. A utility cart, comprising:
a first substantially rigid member;

a second substantially rigid member;

a third substantially rigid member extending between and connecting the first and second rigid members;

a first shelf coupled to and between the first and second rigid members and spaced from the third rigid member by a first distance; and a second shelf coupled to and between the first and second rigid members and spaced from the third rigid member by a second distance greater than the first distance, the second shelf configured to deflect at least one of the first and second rigid members to apply a binding force upon the first shelf.

28. The utility cart of claim 27, the first shelf having a first length extending between the first and second rigid members, the second shelf having a second length extending between the first and second rigid members less than the first length.

29. The utility cart of claim 27, the first rigid member having a first portion extending between the first shelf and the second shelf and a second portion extending between the first shelf and the third rigid member, the first shelf and the first portion defining a first angle therebetween and the first shelf and the second portion defining a second angle therebetween, wherein at least one of the first angle and the second angle is an acute angle.

30. The utility cart of claim 27, wherein the first and second shelves are coupled to the first and second rigid members by bolts.

31. The utility cart of claim 27, further comprising a third shelf coupled to and between the first and second rigid members and spaced from the third rigid member by a third distance greater than the first distance and less than the second distance.

32. The utility cart of claim 27, further comprising a plurality of wheels rotatably coupled to one of the first, second and third rigid members.

33. The utility cart of claim 27, wherein one of the first rigid member and the first shelf includes a first retention surface and the other of the first rigid member and the first shelf includes a first movable surface, the first movable surface being configured to move between a first position out of engagement with the first retention surface and a second position in engagement with the first retention surface to mount the first shelf to the frame, and wherein the first movable surface is resiliently biased in the second position.

34. The utility cart of claim 27, wherein the first, second and third rigid members form a substantially U-shaped frame member.

35. The utility cart of claim 27, wherein the utility cart is a heavy duty cart.

36. A utility cart, comprising:

a first substantially rigid member;

a second substantially rigid member;

a third substantially rigid member extending between and connecting the first and second rigid members;

a first shelf coupled to and between the first and second rigid members; and a second shelf, wherein the first shelf and the first rigid member are coupled together to define a distance between the first and second rigid members at a location at which the second shelf is to be attached, the length of the second shelf at the location of attachment being different than the distance.

37. The utility cart of claim 36, the first rigid member having a first portion extending between the first shelf and the second shelf and a second portion extending between the first shelf and the third rigid member, the first shelf and the first portion defining a first angle therebetween and the first shelf and the second portion defining a second angle therebetween, wherein at least one of the first angle and the second angle is an acute angle.

38. The utility cart of claim 36, wherein the first and second shelves are coupled to the first and second rigid members by bolts.

39. The utility cart of claim 36, the first shelf spaced from the third rigid member by a second distance, the second shelf spaced from the third rigid member by a third distance greater than the second distance, further comprising a third shelf coupled to and between the first and second rigid members and spaced from the third rigid member by a fourth distance greater than the second distance and less than the third distance.

40. The utility cart of claim 36, further comprising a plurality of wheels rotatably coupled to one of the first, second and third rigid members.

41. The utility cart of claim 36, wherein one of the first rigid member and the first shelf includes a first retention surface and the other of the first rigid member and the first shelf includes a first movable surface, the first movable surface being configured to move between a first position out of engagement with the first retention surface and a second position in engagement with the first retention surface to mount the first shelf to the frame, and wherein the first movable surface is resiliently biased in the second position.

42. The utility cart of claim 36, wherein the first, second and third rigid members form a substantially U-shaped frame member.

43. The utility cart of claim 36, wherein the utility cart is a heavy duty cart.

* * * * *